J. SCHOLL AND R. PARLOW.
BEET TOPPER.
APPLICATION FILED NOV. 12, 1921.

1,432,913.

Patented Oct. 24, 1922.

WITNESSES

INVENTORS
John Scholl &
Richard Parlow,
By R. S. Caldwell
ATTORNEY

Patented Oct. 24, 1922.

1,432,913

UNITED STATES PATENT OFFICE.

JOHN SCHOLL AND RICHARD PARLOW, OF BELGIUM, WISCONSIN.

BEET TOPPER.

Application filed November 12, 1921. Serial No. 514,696.

*To all whom it may concern:*

Be it known that we, JOHN SCHOLL and RICHARD PARLOW, citizens of the United States, and residents of Belgium, in the county of Ozaukee and State of Wisconsin, have invented new and useful Improvements in Beet Toppers, of which the following is a description, reference being had to the accompanying drawings, which are a part of this specification.

The invention relates to beet-topping machines.

The object of the invention is to provide a beet-topping machine in which the tops are carried in between a pair of rollers so as to present the beets in a turned up position to a cutter which severs the tops from the beets as they leave the rollers, the machine being particularly designed to handle sugar beets in which a part of the top of the beet body is cut off along with the leaves.

The invention further consists in the several features hereinafter set forth and more particularly defined by claims at the conclusion hereof.

Figure 1:
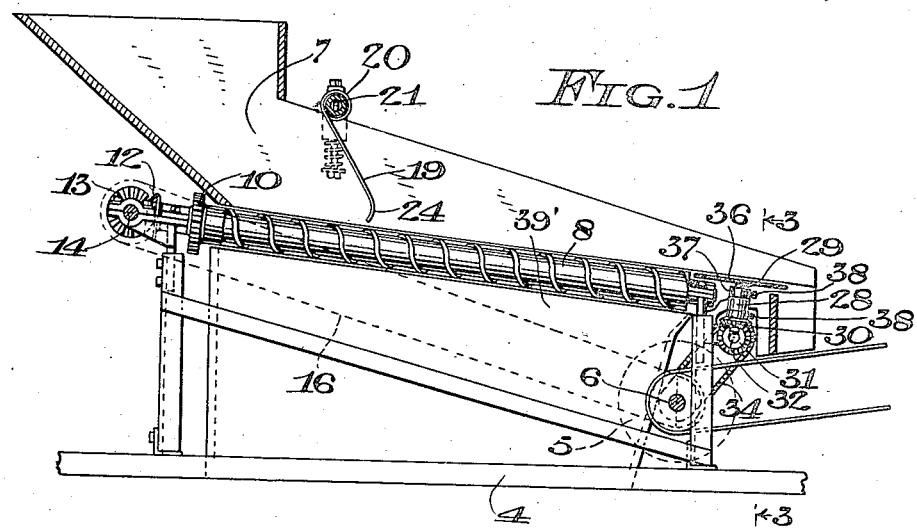
Figure 2:
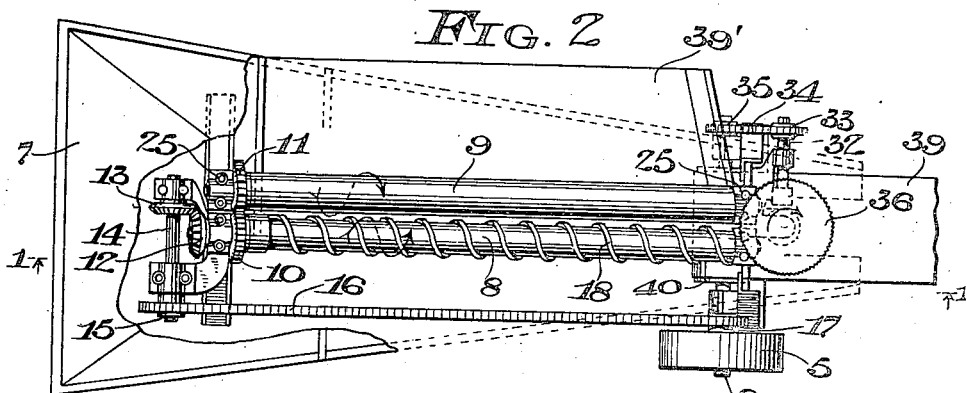
Figure 3:
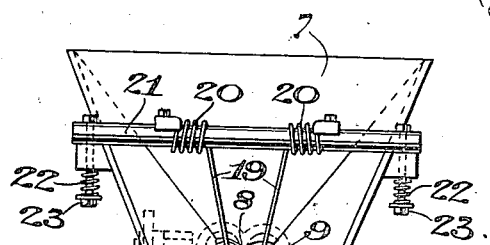

In the drawings: Fig. 1 is a vertical sectional view of a machine embodying the invention, taken on the line 1—1 of Fig. 2; Fig. 2 is a plan view of the machine, parts being broken away; Fig. 3 is a section taken on the line 3—3 of Fig. 1.

In the drawings the numeral 4 designates a frame which may be mounted on wheels and coupled to a wagon, as shown in our copending application, Serial No. 510,515, filed October 26, 1921, and may be provided with a motor connected to the drive pulley 5 on a shaft 6, as in the aforesaid application.

A hopper 7 is mounted on the frame and rolls 8 and 9, preferably supported on an incline, are located at the bottom of the hopper. These rolls are connected together by gears 10 and 11 to rotate in opposite directions, and the roll 8 is driven from the shaft 6 by a gear 12 on the roll meshing with a gear 13 on a shaft 14 carrying a sprocket 15 connected by an endless chain 16 with a sprocket 17 on the shaft 6.

The roll 8 is provided with a helical feed rib 18 so as to insure the feed of the beets along the rolls, the freshly pulled beets being introduced into the upper end of the hopper and the tops being carried in between the rolls so that the beets in an upturned position are carried down along the rolls.

In order that the tops may be efficiently acted upon, we provide a plurality of spring fingers 19 whose upper coiled ends 20 are secured to a shaft 21 mounted on the hopper and capable, in case the beets jam, of moving upwardly against the action of springs 22 interposed between the frame of the machine and the heads of bolts 23 passed through the shaft. The lower ends 24 of these fingers are inclined toward the upper end of the hopper and normally stand just above the feed rolls and catch the leaves of the beets as they pass by and straighten out these leaves so that they may be drawn in between the rolls.

In order to prevent breakage of the rolls when loose rock or other foreign material clinging to the pulled beets gets in between the rolls, the journals 25 for the roll 9 are mounted on swinging arms 26 which are yieldingly held in an operative position by means of springs 27, said springs permitting the arms to swing to separate the rolls 8 and 9.

At the lower end of the rolls 8 and 9 I provide a substantially upright bearings 28 in which a shaft 29 is journalled. The shaft 29 is provided with a gear 30 meshing with a gear 31 on a shaft 32 which carries a sprocket 33 connected by an endless chain 34 to a sprocket 35 on the shaft 6 so that the shaft 29 is continuously rotated. The shaft 29 has a rotary cutter 36 vertically adjustably mounted thereon, the cutter rotating in a plane at substantially right angles to the upturned beets so as to cut off the leaves and a portion of the top of the beet as the beets are fed by the rolls to the cutter. The tops of the beets fall onto an inclined chute or discharge trough 39'. As a means of effecting the vertical adjustment of the cutter a collar 37 is provided with a set screw 38 and the hub of the gear with a similar screw engaging the cutter shaft 29.

A belt 39 running over a pulley 40 on the shaft 6 and disposed beneath the cutter conveys the topped beets to a place of deposit such as a wagon, shown in the aforementioned application.

The term "hopper" in this specification has been used to include what might be termed a chute in which the rolls are disposed.

It is also to be noted that the machine shown and described in the aforementioned application, Serial No. 510,515, is the same as the one above described except that in the present machine the topping knives are removed from the rolls and the rotary cutter with its drive attached to the machine adjacent the lower ends of the rolls.

We desire it to be understood that this invention is not to be limited to any specific form or arrangement of parts except in so far as such limitations are specified in the claims.

What we claim as our invention is:

1. In a beet-topping machine, the combination with a hopper, of a pair of rolls at the bottom thereof along which the beets are fed, said rolls being spaced a short distance apart to receive the tops of the beets, means for rotating said rolls in opposite directions top-straightening fingers spaced from said hopper and disposed adjacent the rolls near the upper end of the hopper, and a rotary top-cutter arranged adjacent the rolls.

2. In a beet topping machine, the combination with a hopper, of a pair of rolls at the bottom thereof along which the beets are fed, said rolls being spaced a short distance apart to receive the tops of the beets, means for rotating said rolls in opposite directions, yieldable fingers for straightening the leaves of the beets during their passage along said rolls, and a rotary cutter positioned adjacent the lower end of said rolls for cutting the tops from the beets.

3. In a beet-topping machine, the combination with a hopper, of a pair of rolls at the bottom thereof along which the beets are fed, said rolls being spaced a short distance apart to receive the tops of the beets, yieldable means depending into the trough and extending down to a position slightly above the rolls to engage and straighten out the leaves of the beets during their passage along said rolls, and a rotary cutter positioned adjacent the lower end of said rolls for cutting the tops from the beets.

In testimony whereof, we affix our signatures.

JOHN SCHOLL.
RICHARD PARLOW.